(12) United States Patent
Bhagchandani et al.

(10) Patent No.: US 7,792,697 B2
(45) Date of Patent: *Sep. 7, 2010

(54) SYSTEM AND METHOD FOR PREDICTING CARD MEMBER SPENDING USING COLLABORATIVE FILTERING

(75) Inventors: Puneet B. Bhagchandani, New York, NY (US); Rachel B. Garrett, New York, NY (US); Vernon Marshall, New York, NY (US); Ali H. Baqri, New York, NY (US); Siddhesh Karmali, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/500,492

(22) Filed: Aug. 8, 2006

(65) Prior Publication Data

US 2007/0143172 A1    Jun. 21, 2007

Related U.S. Application Data

(63) Continuation-in-part of application No. 11/315,262, filed on Dec. 23, 2005.

(51) Int. Cl.
    *G06Q 30/00*    (2006.01)
(52) U.S. Cl. .............. 705/14.52; 705/14.53; 705/14.49
(58) Field of Classification Search .............. 705/14.52, 705/14.53, 14.49, 14.4
    See application file for complete search history.

(56) References Cited

U.S. PATENT DOCUMENTS 4,996,642 A    2/1991    Hey 5,680,305 A *  10/1997   Apgar, IV ................ 705/10
5,790,426 A    8/1998    Robinson
5,884,282 A    3/1999    Robinson
6,026,370 A    2/2000    Jermyn
6,064,980 A    5/2000    Jacobi et al.

(Continued)

FOREIGN PATENT DOCUMENTS

WO    WO 2008/021056    2/2008

OTHER PUBLICATIONS james Gleick, If you like Morzart, you might like Madonna . . . , May 26, 2002 ,The Ottawa Citizen, p. C.2.*

(Continued)

*Primary Examiner*—Michael Bekerman
*Assistant Examiner*—Daniel M Sorkowitz
(74) *Attorney, Agent, or Firm*—Snell & Wilmer L.L.P.

(57) ABSTRACT

The disclosed method and system allows a credit or charge card issuer to provide its card members with a list of restaurants that might be of interest based on the financial transactions of similar card members. In one instance, this method filters financial transaction data from a plurality of card members that involves a plurality of restaurants to generate a set of candidate restaurant recommendations for a selected card member. This set of candidate restaurant recommendations is processed to yield a list of restaurant recommendations for the selected customer that is prioritized on the basis of the selected card member accepting the recommendation. The list of restaurant recommendations is then reported to the selected card member to enhance card use and marketing.

14 Claims, 10 Drawing Sheets

U.S. PATENT DOCUMENTS

| | | |
|---|---|---|
| 6,236,974 B1 * | 5/2001 | Kolawa et al. ................. 705/7 |
| 6,266,649 B1 * | 7/2001 | Linden et al. ................. 705/26 |
| 6,356,879 B2 | 3/2002 | Aggarwal et al. |
| 6,505,168 B1 | 1/2003 | Rothman et al. |
| 6,782,370 B1 | 8/2004 | Stack |
| 7,082,407 B1 * | 7/2006 | Bezos et al. ................. 705/26 |
| 2003/0140023 A1 * | 7/2003 | Ferguson et al. ............. 706/21 |
| 2003/0149623 A1 * | 8/2003 | Chen .......................... 705/14 |
| 2004/0225509 A1 * | 11/2004 | Andre .......................... 705/1 |
| 2006/0143072 A1 | 6/2006 | Herman et al. |
| 2006/0143075 A1 * | 6/2006 | Carr et al. .................... 705/14 |

OTHER PUBLICATIONS

International Search Report for Appln. No. PCT/US2007/017495 issued Aug. 27, 2008, 4 pgs.

\* cited by examiner

300 ↙

| FIRST MERCHANT ID 302 | SECOND MERCHANT ID 304 | # CARD MEMBERS VISITING BOTH 306 | #TRANS- ACTIONS AT SECOND MERCHANT 308 | RATIO 310 | ALGORITHM RANKING 312 |
|---|---|---|---|---|---|
| A100 | B200 | 1 | 1 | 1.00 | 1 |
| A100 | B201 | 300 | 3800 | 0.08 | 534 |
| A100 | B202 | 245 | 1100 | 0.22 | 784 |
| A100 | A108 | 102 | 56500 | 0.00 | 104 |
| A100 | C555 | 70 | 2500 | 0.03 | 89 |
| A100 | A101 | 5 | 20 | 0.25 | 10 |
| A100 | N220 | 11 | 12 | 0.92 | 84 |
| A100 | A440 | 4 | 5 | 0.80 | 12 |

FIG. 3

| PRIMARY MERCHANT 402 | HIGHEST RANKED MERCHANT 404 | SECOND HIGHEST RANKED MERCHANT 406 | THIRD HIGHEST RANKED MERCHANT 408 | FOURTH HIGHEST RANKED MERCHANT 410 | FIFTH HIGHEST RANKED MERCHANT 412 |
|---|---|---|---|---|---|
| A100 | B202 | B201 | A108 | C555 | N220 |
| A101 | B801 | R300 | C421 | A228 | C144 |
| A102 | B764 | C335 | A111 | B564 | H100 |
| A103 | C600 | F327 | I098 | I123 | T102 |

FIG. 4

SYSTEM AND METHOD FOR PREDICTING CARD MEMBER SPENDING USING COLLABORATIVE FILTERING

CROSS REFERENCE TO RELATED APPLICATIONS

This application is a continuation-in-part of pending U.S. patent application Ser. No. 11/315,262, filed Dec. 23, 2005, which claims priority to U.S. Provisional Patent Application No. 60/639,472, filed Dec. 28, 2004, both of which are incorporated by reference herein in their entirety.

BACKGROUND

1. Field of the Invention

This invention generally relates to financial data processing, and in particular, it relates to methods of predicting card member spending using collaborative filtering techniques.

2. Related Art

Consumers are constantly searching for information on products and services that may be of interest to them, but with which they have no actual experience. They typically seek independent information before making certain purchases. Various sources provide reports on products and services to satisfy this consumer demand for information. For example, ZAGATS provides ratings on restaurants and CONSUMER REPORTS provides detailed listings on product quality and customer satisfaction. When making a purchase of a selected product on web sites such as AMAZON.COM, information is typically provided about other products purchased by customers who have also purchased the selected product.

Consumers frequently use credit, debit, stored value or charge cards (collectively referred to herein as transaction instruments) in transactions with various merchants. This data is collected and processed en mass by credit providers for billing purposes and the like. However, little has been done to harness such card member transaction details for marketing purposes.

BRIEF DESCRIPTION

Accordingly, the present disclosure introduces methods and systems for processing financial transaction data, in which transaction data between card members and merchants is captured and analyzed for predicted spending habits of a number of card members.

According to various embodiments of the disclosed processes, financial transactions from a plurality of card members and a plurality of restaurants are identified over a period of time. For a selected card member of the plurality of card members, the method then filters the plurality of restaurants to generate a set of candidate restaurants for the selected card member. The filtering may be performed on the basis of a strength of association between pairs of restaurants within the plurality of restaurants, an average transaction size, and geographic location. The set of candidate restaurants are then processed to generate a list of recommended restaurants for the selected card member, and the list of recommended restaurants are then reported to the card member. The list of restaurants may be prioritized on the basis of a probability that the selected card member will accept the recommended restaurant. The list of recommended restaurants may be limited to a specific number of restaurants, the list of recommended restaurants may be reported to the selected card member electronically.

Further features and advantages of the present invention as well as the structure and operation of various embodiments of the present invention are described in detail below with reference to the accompanying drawings.

BRIEF DESCRIPTION OF THE DRAWINGS

The features of the present invention will become more apparent from the detailed description set forth below when taken in conjunction with the drawings. The left-most digit of a reference number identifies the drawing in which the reference number first appears.

FIG. 3 is a diagram of an exemplary collaborative filtering database for use with the process of FIG. 2.

FIG. 4 is a diagram of exemplary ranking results using the collaborative filtering process of FIG. 2.

DETAILED DESCRIPTION

Figure 1:
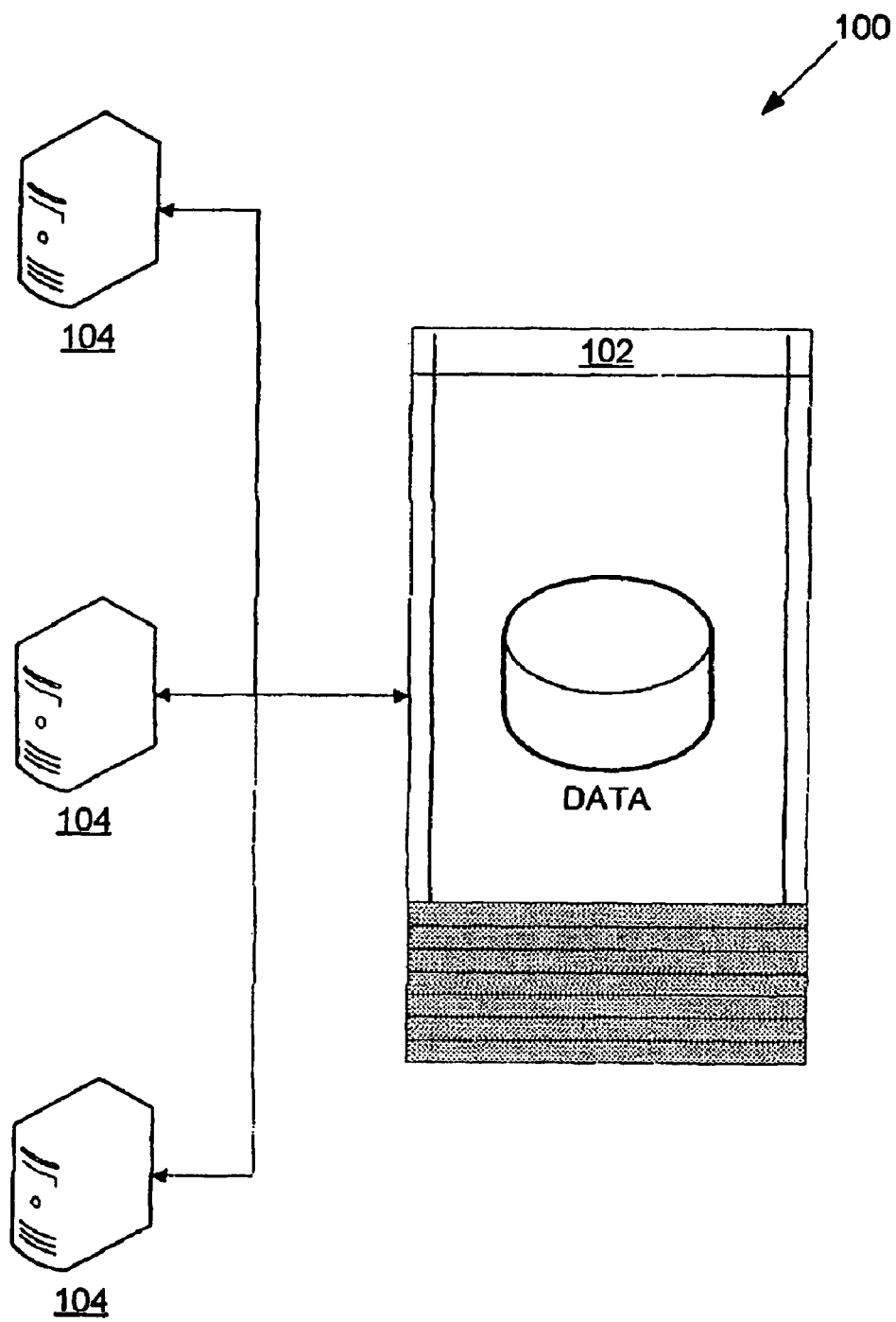
FIG. 1 is a block diagram of an exemplary computer network over which the processes of the present disclosure may be performed.

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Overview

The collaborative filtering processes now introduced allows a credit, debit, stored value or charge card provider, such as AMERICAN EXPRESS, to analyze financial transaction data involving its card members (i.e., holders of a particular brand of credit instrument) that is typically used only for billing purposes. The system also harnesses such information in order to assist consumers in making other purchases at merchants that have appealed to other (similarly-situated) card members. According to such processes, merchants who accept a particular brand of credit instrument are grouped by location and industry code. Financial transactions between card members and the various merchants within one or more groups are analyzed to identify those merchants with common card member patronage, and to further rank merchants within a group that have had common patronage among card members. The ranking of similar merchants may be reported to card members who have made at least one purchase from a merchant within the group in order to assist the card members in making their purchases at similar merchants. Such reporting may be accompanied by discounts on purchases at such other merchants, if desired. The ranking of merchants may also be communicated to the merchants themselves (in a manner such that card member privacy without is not violated), who may then properly use such information for their marketing purposes.

Additionally, these processes identify financial transaction data from a plurality of card members and a plurality of restaurants over a period of time. The identified financial transactions are filtered to generate a set of candidate restaurants for a selected card member of the plurality of card members. The filtering may be performed on the basis of, for example, a strength of association between the plurality of restaurants, an average transaction size, and geographic location. The set of candidate restaurants are then processed to generate a list of recommended restaurants for the selected card member, and the list of recommended restaurants are then reported to the card member. The list of restaurants may be prioritized on the basis of a probability that the selected card member will accept the recommended restaurant, and the list may be ranked in descending order of probability. The list of recommended restaurants may be limited to a specific number of restaurants, and the list of recommended restaurants may be reported to the selected card member electronically.

EXAMPLE 1

Systems and Processes for Collaborative Filtering of Card Member Transactions

Referring now to FIGS. 1-4, wherein similar components of the present disclosure are referenced in like manner, and wherein various embodiments of a method and system for collaborative filtering of card member transactions are disclosed.

Turning to FIG. 1, there is depicted an exemplary computer network 100 over which the transmission of financial transaction data as described herein may be accomplished, using any of a variety of available computing components for processing such data. Such components may include a credit provider server 102, which may be a computer, such as an enterprise server of the type commonly manufactured by SUN MICROSYSTEMS. The credit provider server 102 has appropriate internal hardware, software, processing, memory and network communication components, which enables it to perform the functions described herein. General software applications may include the SOLARIS operating system and SYBASE IQ data management and analysis tools. The credit provider server 102 stores financial transaction data in appropriate memory and processes the same according to the processes described herein using programming instructions that may be provided in any of a variety of useful machine programming languages. It should be readily apparent that any number of other computing systems and software may be used to accomplish the processes described herein.

The credit provider server 102 may, in turn, be in operative communication with any number of other external servers 104, which may be computers or servers of similar or compatible functional configuration. These external servers 104 may gather and provide financial transactions data, as described herein, and transmit the same for processing and analysis by the credit provider server 102. Such data transmissions may occur for example over the Internet or by any other known communications infrastructure, such as a local area network, a wide area network, a wireless network, a fiber-optic network, or any combination or interconnection of the same. Such communications may also be transmitted in an encrypted or otherwise secure format, in any of a wide variety of known manners. Each of the external servers 104 may be operated by either common or independent entities, and in certain embodiment may represent point-of-sale terminals where card member transactions are initiated, or may be servers operated by credit card clearinghouses that typically process credit transactions.

Figure 2:
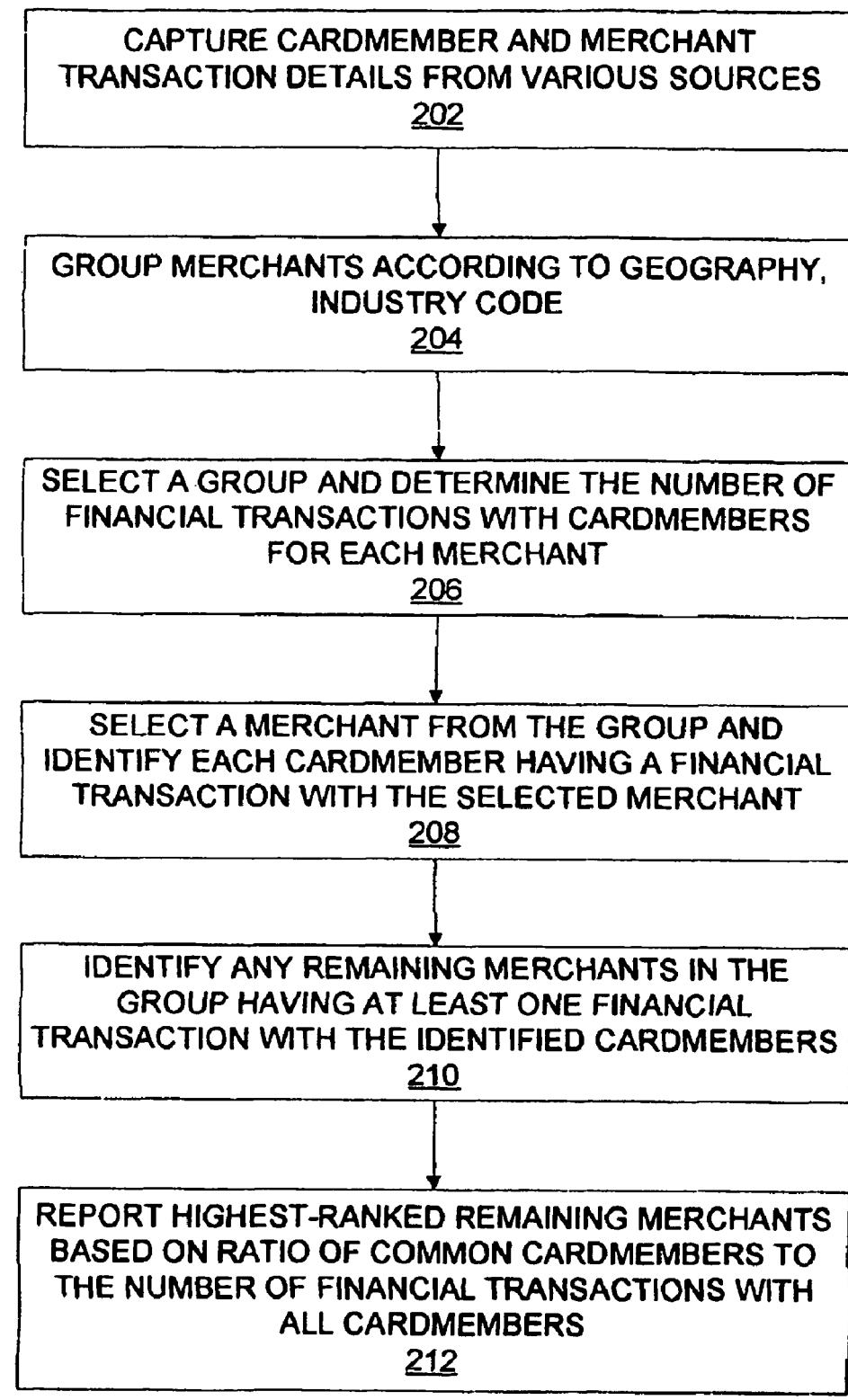
FIG. 2 is a flowchart of an exemplary collaborative filtering process performed over the network of FIG. 1.

Turning now to FIG. 2, therein is depicted an exemplary collaborative filtering process 200 performed by the credit provider server 102 using the financial transaction data obtained by and transmitted from the external servers 104.

The process 200 commences with the capture of financial transaction data involving a plurality of card members and merchants over a period of time (step 202). Such financial transaction data may include, but is not limited to, an identification of the card member (such as by name and/or account number), an identification of the merchant (such as by name or merchant identification number), a financial amount of the transaction, and the date of the transaction. The period of time may be for example a month, a quarter, a year or any other desired period of time. The credit provider server 102 may store such received data in a suitable database format for analysis as described herein.

Next, the credit provider server 102 groups similar merchants having transactions with card members according to their geographic location and an applicable industry code (step 204). The grouping of the merchants by geographic location may be accomplished according to the zip code, street address, city, metropolitan area (MSA) or county in which the merchants reside, which is typically readily available to credit providers. The grouping by geographic location ensures that card members who have frequented a merchant in that location may be amenable to visiting other merchants in the same location.

The further grouping of merchants by industry code ensures that the merchants within the group offer similar products and services. The industry code may be a Standard Industry Classification (SIC) code that may be assigned to merchants by a government agency. The industry code may further be a proprietary classification code assigned by a credit provider, issuer, or acquiror to a class of merchants to uniquely identify the products or services offered by such merchants.

Next, at step 206, a group of merchants is selected for analysis wherein the number of financial transactions with card members is determined and stored for each merchant in the group. This information may then be stored by the credit provider server 102 in a database, such as database 300 described below with respect to FIG. 3.

Next, at step 208, a merchant is selected from the group, and each card member having at least one transaction with that merchant is identified from the stored financial transaction data.

Next, at step 210, it is determined whether any other merchants within that group have had transaction with any of the card members identified in step 208 above. Those merchants having transactions with common card members are identified and ranked based on a ratio of the number of number of transactions with common card members to the total number of transactions with all card members determined in step 206 above.

One exemplary method for ranking merchants will now be described with reference to FIG. 3 wherein an exemplary merchant ranking database 300 used by the collaborative filtering process 200 is depicted. The database 300 has a number of fields represented by columns in FIG. 3 and a number of database records, represented as rows within FIG. 3. This database 300 may include: (i) a first merchant identifier field 302 for storing an identification of a first merchant being analyzed by the collaborative filtering process 200; (ii) a second merchant identifier field 200 for storing an identification of similar merchants having transactions with common cardholders; (iii) a number of common card members field 306 for storing a number of card members who have frequented both the merchants identified in fields 302 and 304; a number of total transactions field 308 for storing the total number of card member transactions involving the second merchant identified in field 304; a ratio field 310 for storing the ratio of the value stored in field 306 to the value stored in field 308; and a ranking field that stores the result of a ranking applied to the data in fields 306-308.

A problem exists with simply using the ratio value 310 to directly rank similar merchants within a group. This problem becomes apparent when the number of shared card members is low, or is close to the total number of transactions at the second merchant. Either scenario, or a combination of the two, would result in a ratio of nearly 1:1. However, particularly in the case where there are few shared card member transactions, simply using the highest ratios may not be representative of a true correlation between the patronage of the first and second merchants.

Accordingly, a mathematical solution may be applied that discounts such problematic data. One such solution may be expressed as follows:

$$C = A + (10 * B * (A-3))$$

where:

C is the value stored in field 312;

A is the value stored in field 306;

B is the ratio value stored in field 310, obtained by dividing the value stored in field 306 by the value stored in field 308; and the value of (A−3) is set to zero if it results in zero or a negative number.

It should be noted that, in one embodiment, the corrective factor 10*B*(A−3) has been incorporated to discount coincidences from merchants having relatively few numbers of common card member transactions, and add weight to those with higher ratios and numbers of common transactions. The variables in the corrective factor were determined to be suitable based on experimental data and may be altered or adjusted based on empirical data resulting from actual use of the collaborative filtering processes. Other suitable corrective factors may also be applied.

Returning to the process 200, upon completion of the analysis in step 210 above, each of the remaining merchants within the group are ranked according to the value stored in field 312 for them, wherein the highest-ranked second merchant has the highest ranking value and the lowest-ranked second merchant has the lowest ranking value. The credit provider server may rank only a threshold number of second merchants, such as the top five merchants.

These merchants may then be stored in a merchant ranking database 400 shown in FIG. 4. An exemplary merchant ranking database 400 includes the following fields: (i) a primary merchant field 402 for storing an identification of a first merchant in a group; (ii) a highest ranked merchant field 404 for storing the highest ranked merchant in the group based on its ranking; (iii) a second-highest ranked merchant field 404 for storing an identification of the second highest ranked merchant in the group; and (iv) third though fifth highest-ranked merchant fields 408-412 for storing the respective appropriate merchant identifications.

The merchant rankings stored in database 400 may be reported to card members in any of a variety of manners. In one example, the collaborative filtering processes could be used to identify restaurants that a card member may wish to try. Suppose Card member A recently ate at a Sushi Restaurant in Manhattan. The collaborative filtering process 200 could be used to identify and report the highest-ranked restaurants (based on similar industry codes, and therefore, similar services) where other card members who have dined at the Sushi Restaurant have also dined. Based on Card member A's patronage of the Sushi Restaurant, a report of these highest ranked restaurants may be provided with Card member A's billing statement or otherwise communicated to the card member by, for example, a separate mailing, electronic means (e.g., e-mail) or telemarketing means.

In another embodiment, card members who are identified as having vacationed in a certain destination could be informed of other top vacation destinations by other card members who have also vacationed at that destination. Such vacation destinations may or may not be grouped by similar geographic location or similar merchants, but instead may simply be based on overall card member preferences.

In an additional embodiment, the ranking information produced by the collaborative filtering process described herein may be provided to merchants themselves. For example, a restaurateur may learn that many customers of a competing restaurant also tend to frequent their establishment. The restaurateur may then offer to accept coupons from that competitor in order to attract new customers.

EXAMPLE 2

Systems and Methods of Predicting Spending Habits Using Collaborative Filtering Techniques Referring now to FIGS. 5-10, wherein similar components of the present disclosure are referenced in like manner, and various embodiments of a system and method for predicting spending habits of a number of card members using collaborative filtering techniques.

Figure 5:
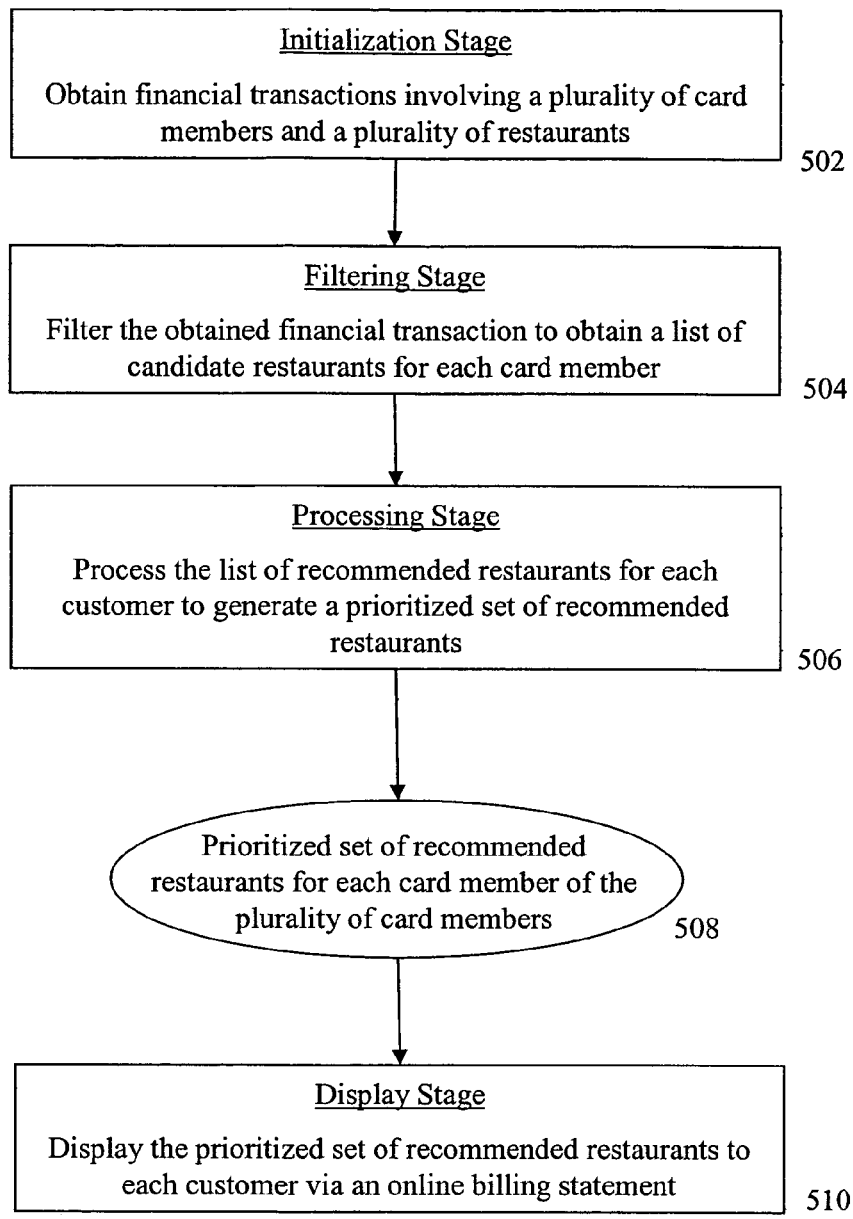
FIG. 5 is an exemplary method of practicing the present invention.

FIG. 5 is an exemplary method for predicting spending habits of a number of card members using collaborative filtering techniques. In FIG. 5, an initialization stage within step 502 provides financial transaction data from a plurality of card members and a plurality of restaurants over a period of time. The provided set of financial transaction data may include data on the plurality of customers, including billing addresses, and data on financial transactions involving the plurality of restaurants, including, for each transaction, a transaction size and a geographic location of the restaurant.

The financial transaction data provided by step 502 are then passed into a filtering stage in step 504. The filtering stage 504 then filters the financial transaction data to generate a set of candidate restaurants for a selected card member of the plurality of card members. In one embodiment, the filtering stage 504 may apply collaborative filtering techniques to eliminate potential candidate restaurants based on a strength of association. Further, the filtering stage 504 may generate the set of candidate restaurants on the basis of, for example, the average transaction size and the geographic location of the candidate restaurant.

The set of candidate restaurants is then processed by a processing stage in step 506 to generate a prioritized list of recommended restaurants for the selected card members. In one embodiment, the processing stage 506 computes a probability that the selected card member will accept each restaurant recommendation. The computed probability of acceptance may then be used to rank the list of recommended restaurants to generate a prioritized list of recommended restaurants 508.

The prioritized set of recommended restaurants 508 is then passed to a display stage in step 510, which provides the selected card member a visual display of the prioritized list of recommended restaurants. The display stage 510 may present the prioritized set of restaurant recommendations electronically as a feature within an online account statement. When displaying the recommendations electronically using the online account statement, the display stage 510 may also link the recommended restaurants to maps and driving directions and to restaurant reviews. The method outlined by steps 502 through 510 of FIG. 6 may then be repeated for each card member within the plurality of card members.

Figure 6:
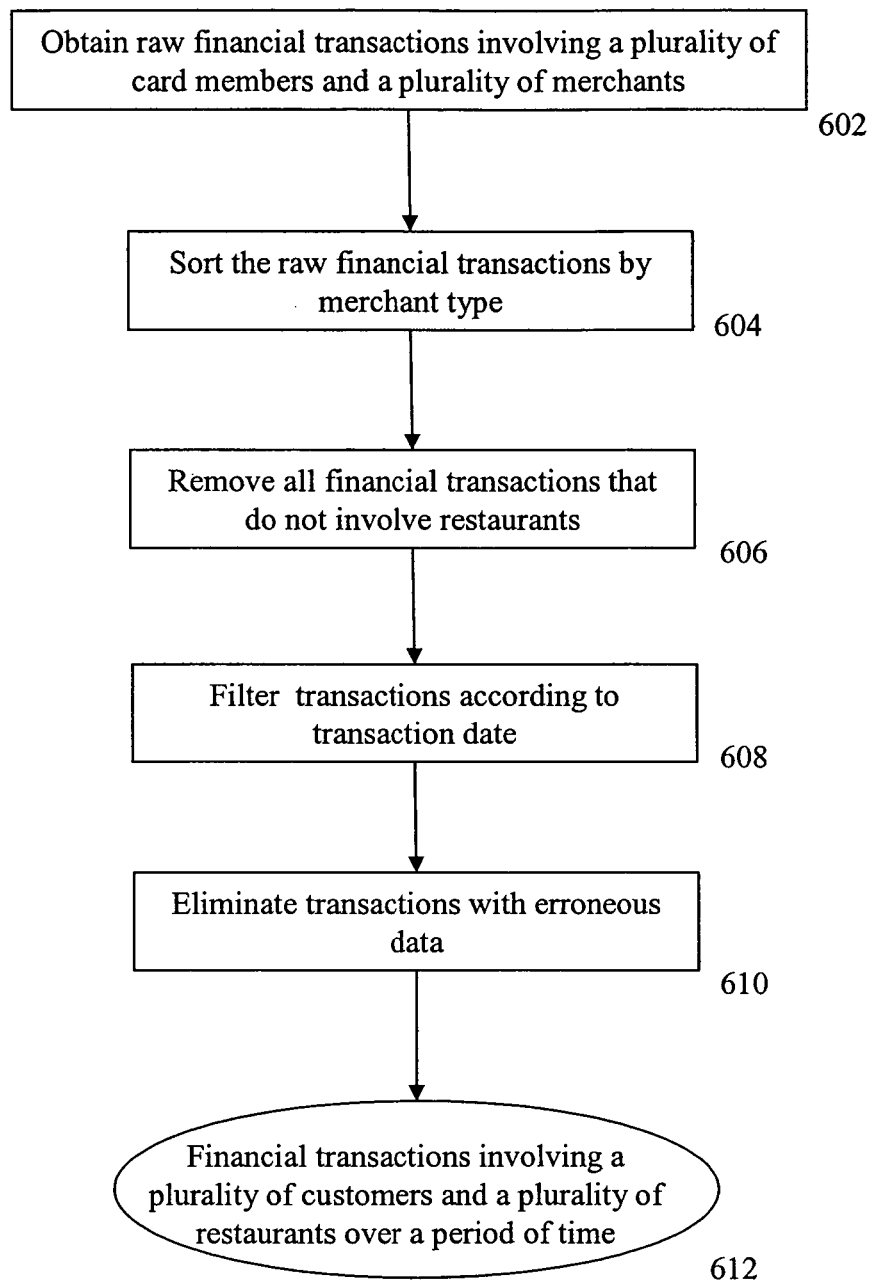
FIG. 6 is a detailed illustration of an initialization stage that may be incorporated into the exemplary method of FIG. 5.

FIG. 6 is a detailed illustration of an initialization stage 600 that may be incorporated into the exemplary method of FIG. 5. In FIG. 6, step 602 provides raw financial transaction data from a plurality of card members and a number of merchants. The set of raw financial transaction data is then sorted according to merchant type in step 604, and the resulting sorted data is filtered in step 606 to eliminate all transactions that do not include restaurants. The financial transaction data may be additionally filtered to obtain data on financial transactions during a selected period of time in step 608. Further, the financial transaction data may be examined for errors, and those transactions containing erroneous data (e.g. invalid customer codes, invalid service establishments, etc.) are removed from set of financial transaction data in step 610. The output of the initialization stage 600 is a set of financial transaction data 612 from a plurality of card members and a plurality of restaurants over the period of time.

Figure 7:
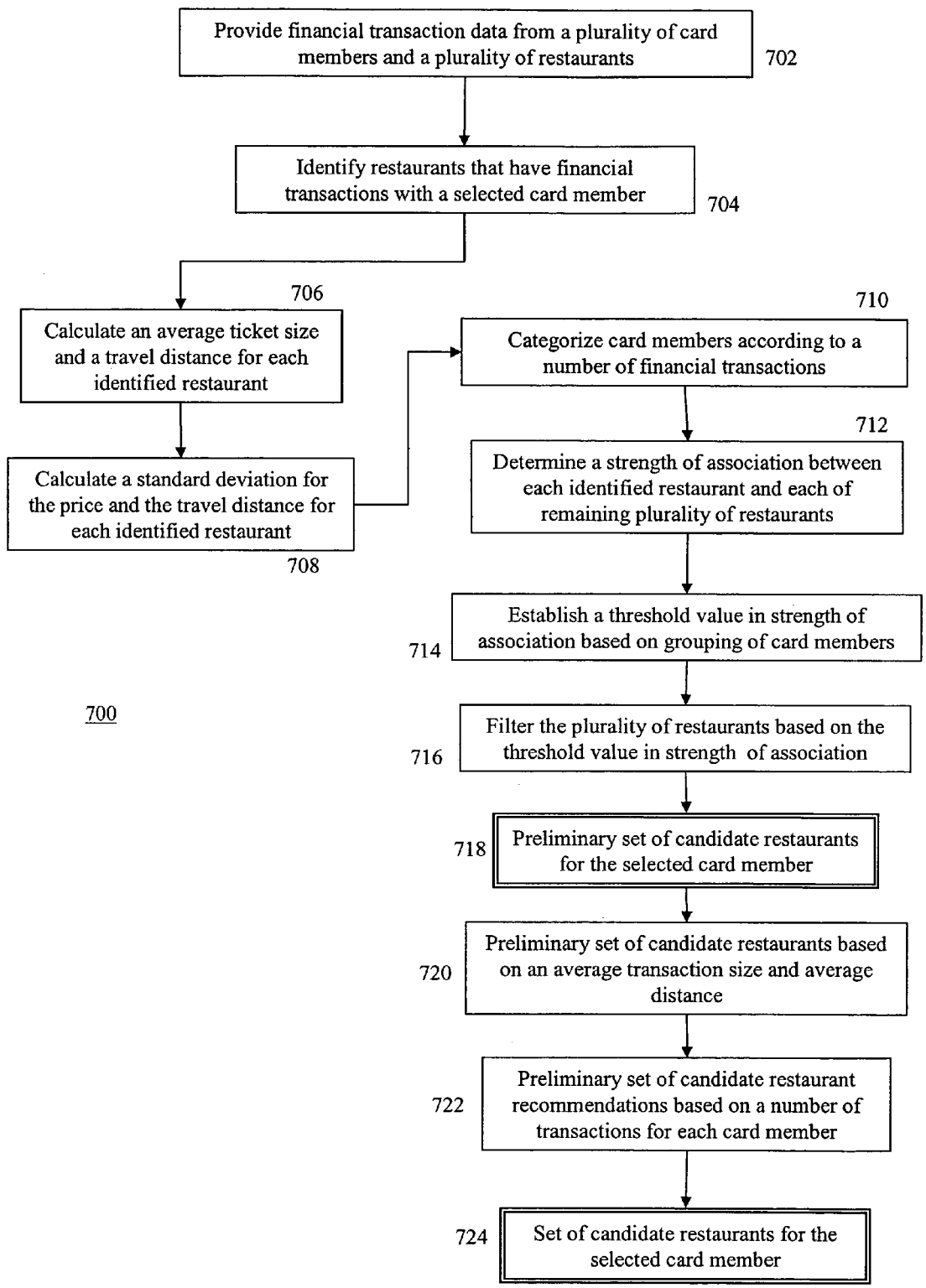
FIG. 7 is a detailed illustration of a filtering stage that may be incorporated into the exemplary method of FIG. 5.

FIG. 7 is a detailed illustration of a filtering stage 700 that may be incorporated into the exemplary method of FIG. 5. In FIG. 7, step 702 provides financial transaction data from plurality of individual card members that involves a plurality of restaurants over a period of time in step 702. Step 704 then identifies a set of identified restaurants that have at least one financial transaction with a selected card member.

The set of financial transaction data and the set of identified restaurants are used to compute an average transaction size for the identified restaurants in step 706. Step 706 also computes a travel distance for each identified restaurant. The travel distance represents the distance traveled by the selected card member when visiting each identified restaurant, and the travel distance may be computed relative to the home or office of the selected card member. The standard deviations corresponding to the average transaction size and to the travel distances are then computed in step 708.

Once these statistics for the selected card member have been computed in steps 706 and 708, a collaborative filtering process is initiated and applied to the plurality of restaurants in step 710. The collaborative filtering process may identify restaurants that are of potential interest to card members based upon: (i) those restaurants that the card member has previously visited and (ii) restaurants that card members with similar dining preferences have visited.

In step 710, each card member within the plurality of card members is categorized based on the number of restaurants having at least one financial transaction with the card member over the period of time. In one embodiment, the plurality of card members may be categorized as either "variety lovers" or "variety acceptors." "Variety lovers" are those card members having financial transactions at a large number of restaurants, and/or restaurants in a wide variety of cuisine categories, thus indicating that they are willing to try a wide variety of different cuisines. "Variety acceptors," on the other hand, tend to have financial transactions at fewer restaurants and/or at restaurants in limited cuisine categories. Hence, "variety acceptors" are card members that may not be very adventurous in their dining choices.

Once the plurality of card members have been categorized in step 710, the collaborative filtering method then passes into step 712, which determines a strength of association between each potential pair of restaurants within the plurality of restaurants. In one embodiment, the strength of association for each restaurant in the potential pair may be determined from a number of card members that have financial transactions at both restaurants. For example, assume that eighty (80) card members have financial transactions with "Restaurant A" over a period of time and that 160 card members have financial transactions with "Restaurant B" over the same period of time.

Assuming that twenty (20) customers have financial transactions with both restaurants, then the respective strengths of association for "Restaurant A" and "Restaurant B" may be computed as follows:

Strength of Association (Restaurant $A \rightarrow B$)=20/80=25%

Strength of Association (Restaurant $B \rightarrow A$)=20/160=12.5%.

The computed strengths of association indicate that 25% of the card members having financial transactions with "Restaurant A" also have financial transactions with "Restaurant B," while only 12.5% of the card members having financial transactions with "Restaurant B" also have financial transactions with "Restaurant A." As such, the card members having financial transactions with "Restaurant A" experience a much stronger association with "Restaurant B" than card members having financial transactions with "Restaurant B" experience with respect to "Restaurant A."

A threshold value for filtering the plurality of restaurants according to their computed strengths of association is then computed within step 714. In one embodiment, the threshold value is tied closely to a willingness of card members to accept a variety of restaurant choices. As such, the threshold value may be dependent upon the categorization of card members outlined in step 710.

For example, card members classified as "variety lovers" will accept a wider variety of cuisines, and thus, they may be willing to visit restaurants that have a weaker tie to those they have visited. However, those card members classified as "variety acceptors" tend to be less adventurous in choice of restaurant, and would accept a limited variety of restaurants and will likely be willing to visit restaurants that are closely tied to their own preferences. Thus, the threshold strength of association used to filter potential restaurants for "variety lovers" will be lower in magnitude than the threshold strength of association used to filter restaurant recommendations for "variety acceptors." In the example described above, "variety lovers" may accept restaurants whose strength of association is 10%, while "variety acceptors" may require restaurants with a strength of association greater than 20%.

Once the threshold value has been established for each of the plurality of card members, then collaborative filtering is applied to the plurality of restaurants in step 716. The filtering process of step 716 eliminates those restaurants from the plurality of restaurants whose strength of association is below the threshold value for the selected card member. Using the examples outlined above, both "Restaurant A" and "Restaurant B" could be recommended to a "variety lover," as both restaurants have a strength of association greater than the 10% threshold associated with a "variety lover." However, in the case of a "variety acceptor," the filtering process eliminates "Restaurant A" and retains "Restaurant B" as potential recommendations, since the threshold value associated with the "variety acceptor" is tighter.

The filtering process of step 716 results in a preliminary set of candidate restaurants 718 for the selected card member. This preliminary set of restaurants is then passed to step 720, which further filters the candidate restaurants.

In step 720, the preliminary set of candidate restaurant recommendations for the selected card member is filtered according to preferences of the selected card member. Step 720 may eliminate candidate restaurants for the selected card member based on: (i) the average transaction size of candidate restaurants and (ii) the geographic location of candidate restaurants. Step 720 may eliminate those candidate restaurants whose transaction size does not fall within a predetermined amount of the average transaction size of the selected card member. Step 720 may further eliminate restaurants from the set of candidate restaurants if they are not located near restaurants the card member has visited, as exemplified by the travel distances computed in step 706.

Once filtered for price and location in step 720, the set of candidate restaurant recommendations is filtered on the basis of a number of financial transactions in step 722. As one goal of the collaborative filtering process is to recommend new restaurants to card members, step 722 may eliminate from consideration those restaurants at which the selected card member has more than, for example, two financial transactions. The result of the filtering process in step 722 is a set of candidate restaurants 724 that passes back into the processing step of the exemplary method of FIG. 1.

Figure 8:
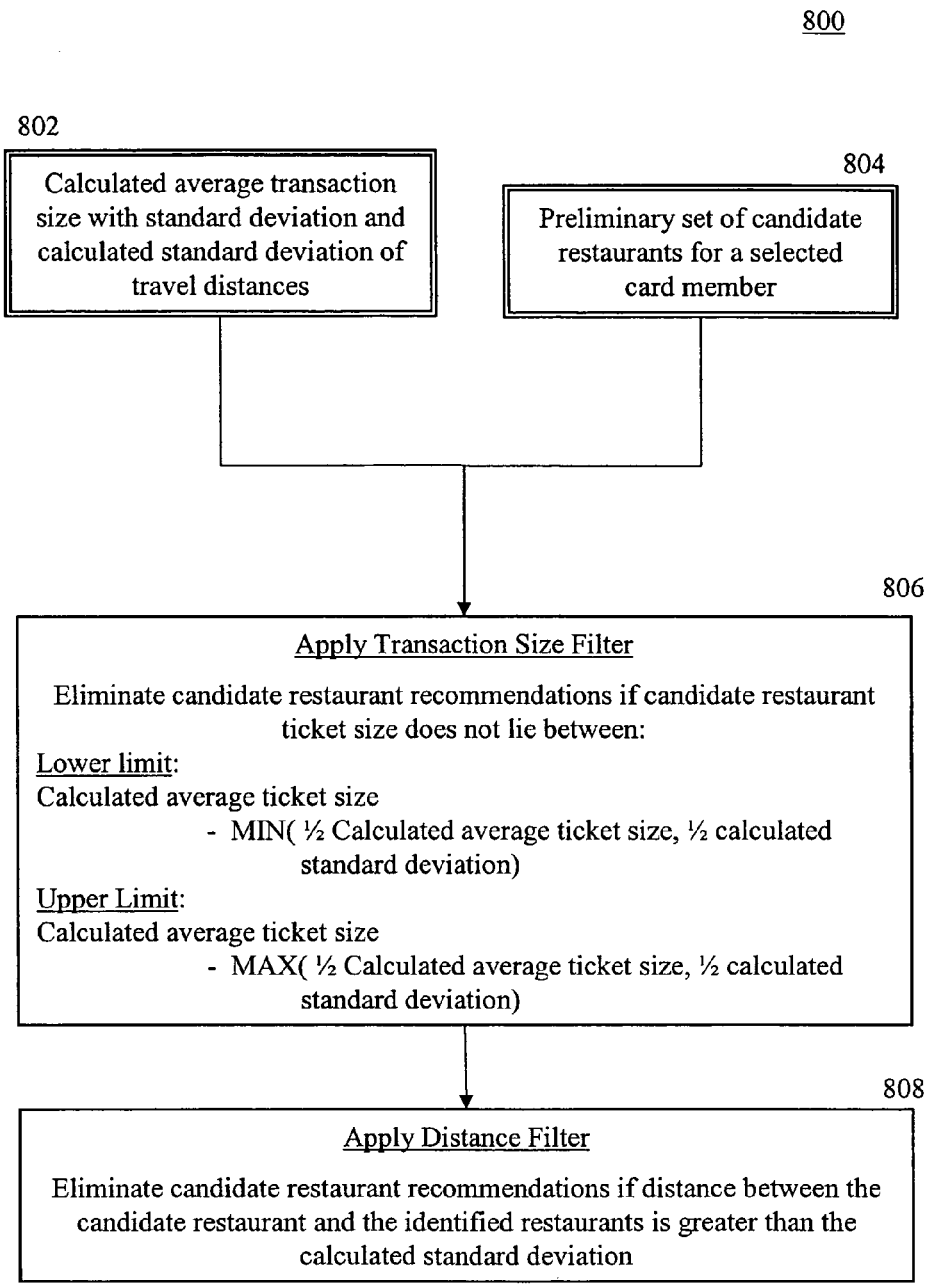
FIG. 8 is a detailed flow chart of a transaction size filter and distance filter that may be incorporated into the exemplary filtering stage of FIG. 7.

FIG. 8 is a detailed flow chart of a transaction size filter and distance filter that may be incorporated into the exemplary filtering stage of FIG. 7. In FIG. 8, step 802 provides a set of calculated statistics for the selected card member, including an average transaction size for the identified restaurants, a standard deviation of the average transaction size, and a standard deviation of travel distances associated with each identified restaurant. Step 804 also provides a preliminary set of candidate restaurants for the selected card member.

In step 806, a transaction size filter is applied to the preliminary set of candidate restaurant recommendations. The transaction size filter eliminates, for the selected card member, restaurants from the set of candidate restaurant recommendations if a transaction size associated with the candidate restaurant falls outside of an upper and a lower bound. In one embodiment, the lower bound on transaction price is defined as the calculated average transaction size minus the minimum of one-half of the calculated average transaction size and one-half of the calculated standard deviation. In a similar fashion, the upper bound on transaction price is defined as the sum of the calculated average transaction size and the minimum of one-half of the calculated average transaction size and one-half of the calculated standard deviation. The transaction size filter 806 assures that the candidate restaurant falls within a price range that is acceptable to the selected card member. However, this transaction size-filter cannot account for transaction sizes that are artificially large due to party size (e.g., numerous trips to a fast-food restaurant in which a card member pays for multiple meals).

In step 808, a distance filter is applied to the preliminary set of candidate restaurants. The distance filter eliminates, for the selected card member, restaurants from the set of candidate restaurants if a distance between the candidate restaurant and any identified restaurant is larger than an upper bound. In one embodiment, the upper bound may be defined as the standard deviation of the travel distances provided within step 802. The output of the filtering steps 806 and 808 is a set of candidate restaurants that is within an acceptable travel distance and transaction size for the selected card member, and the set of candidate restaurants is passed back into the exemplary filtering stage of FIG. 7.

In the present embodiment, the transaction size filter 806 and the distance filter 808 are applied to the set of candidate restaurants in sequence. However, additional embodiments may reverse this sequence and apply the distance filter to the set of candidate restaurants prior to applying the transaction size filter.

Figure 9:
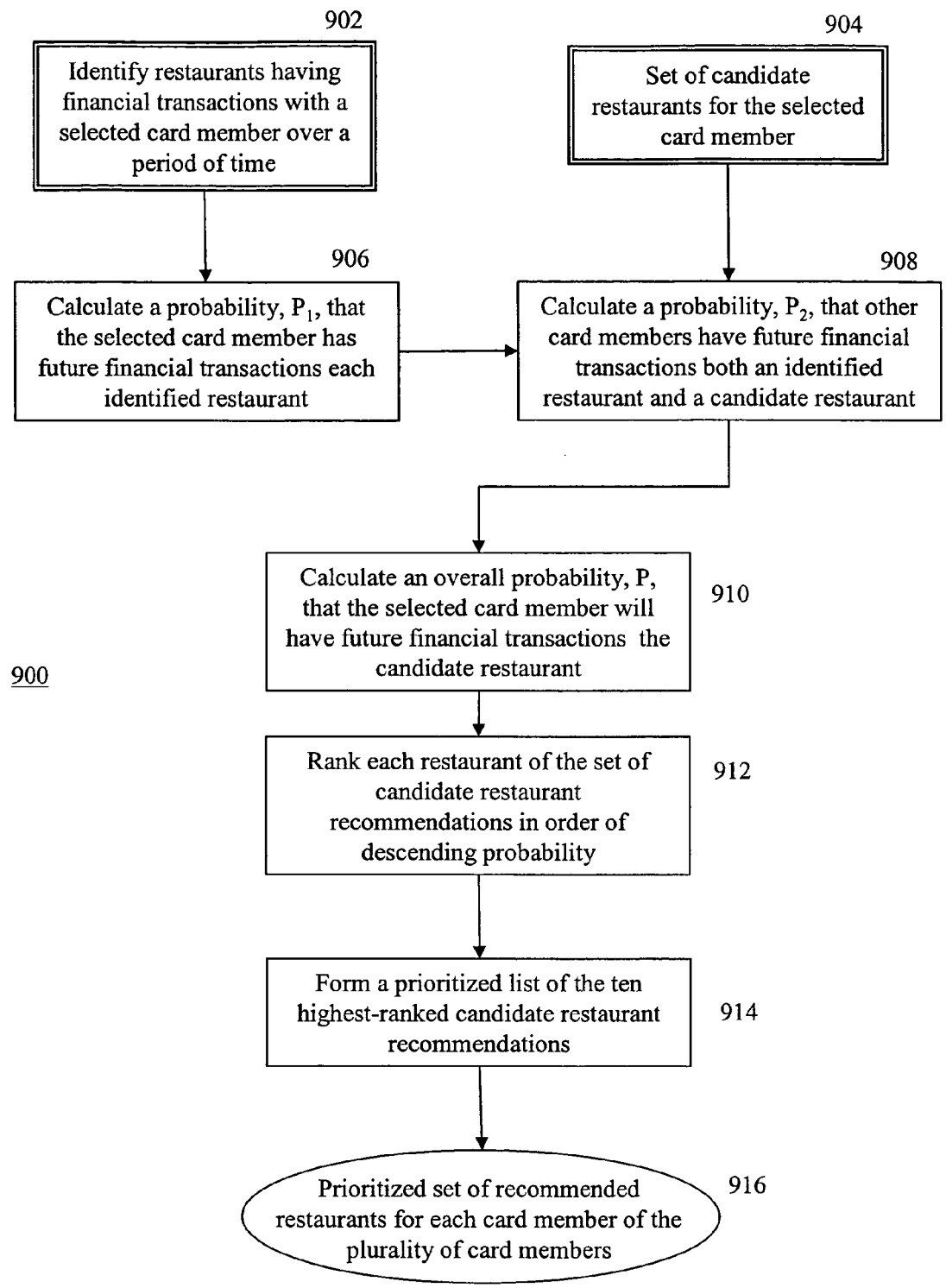
FIG. 9 is a detailed flow chart of a processing stage that may be used within the exemplary embodiment of FIG. 5.

FIG. 9 is a detailed illustration of processing stage 900 that may be incorporated into the exemplary method of FIG. 6. In FIG. 9, Step 902 identifies restaurants that have financial transactions with a selected card member over a period of time. Step 904 provides set of candidate restaurants for the selected card member that has been filtered in accordance with the methods of FIG. 7.

Step 906 computes a first probability that the selected card member will have at least one future financial transaction with a restaurant i within the set of identified restaurants. In one embodiment, this probability may be defined by:

$$P_{1,i}=A/B$$

where:
A=number of financial transaction involving the card member and the identified restaurant i
B=total number of financial transactions involving the card member and any restaurant.

Step 908 then computes a second probability that other card members within the plurality of card members will have future financial transactions involving both the identified restaurant and a restaurant within the set of candidate restaurants for the selected card member. For a given pair of identified and candidate restaurants, step 908 first identifies: (i) a number of linking card members that have financial transactions at the identified and candidate restaurants; (ii) a total number of financial transactions involving the linking card members; (iii) number of financial transactions involving the identified restaurant; and (iv) a number of financial transactions involving the candidate restaurant.

For the given pair of identified and candidate restaurants, the probability that other card members will have future financial transactions involving both the identified restaurant i and the candidate restaurant j is defined by:

$$P_{2,i,j}=A/C*B/C.$$

where:
A=number of financial transaction involving the identified restaurant
B=number of financial transactions involving the candidate restaurant
C=total number of financial transactions involving the linking card members.

The second probability must be computed for each potential pair of identified restaurant i and candidate restaurant j for the selected card member. Once the first and second probabilities have been computed in steps 906 and 908, respectively, these values may be combined in step 910 to form an overall probability that the selected card member will have a future financial transaction with restaurants in the corresponding set of candidate restaurants. Thus, for a specific candidate restaurant j associated with the selected card member, the probability that the selected card member will have a future financial transaction with the candidate restaurant is given as:

$$P_j = \sum_{\substack{i=1 \\ i \neq j}}^{Identified\ Restaurants} P_{1,i} P_{2,i,j}.$$

The probability that the selected card member will have a future financial transaction a restaurant within the corresponding set of candidate restaurants is the product of the probability that the card member will have a future financial transaction the identified restaurant and the probability that other card members will have future financial transactions with the identified and the candidate restaurants, summed over all identified restaurants for the selected card member.

The process outlined above must be performed for each restaurant within the set of candidate restaurants associated with the selected card member. The output of step 910 is a list of recommended restaurants for the selected card member and a probability that the selected card member will visit each recommended restaurant within the list. Although described herein using particular probabilistic techniques, it will be evident to one skilled in the art that any probabilistic or stochastic technique that determines the probability that the card member will have future financial transactions with the candidate restaurant may be incorporated into the exemplary method.

Once the probability that the selected card member will have a future financial transaction with restaurants on the list of recommended restaurants has been computed in step 910, the list of recommended restaurants is then prioritized on the basis of the computed probability in step 912. In one embodiment, the list of recommended restaurants is ranked according to the computed probability in descending order to generate a prioritized list of recommended restaurants for each card member in step 914. In an additional embodiment, the list is limited to ten candidate restaurants with the highest probability. The prioritized set of recommended restaurants for each card member 916 is then passed back into the display stage within the exemplary method of FIG. 5.

Exemplary Computer Systems

Figure 10:
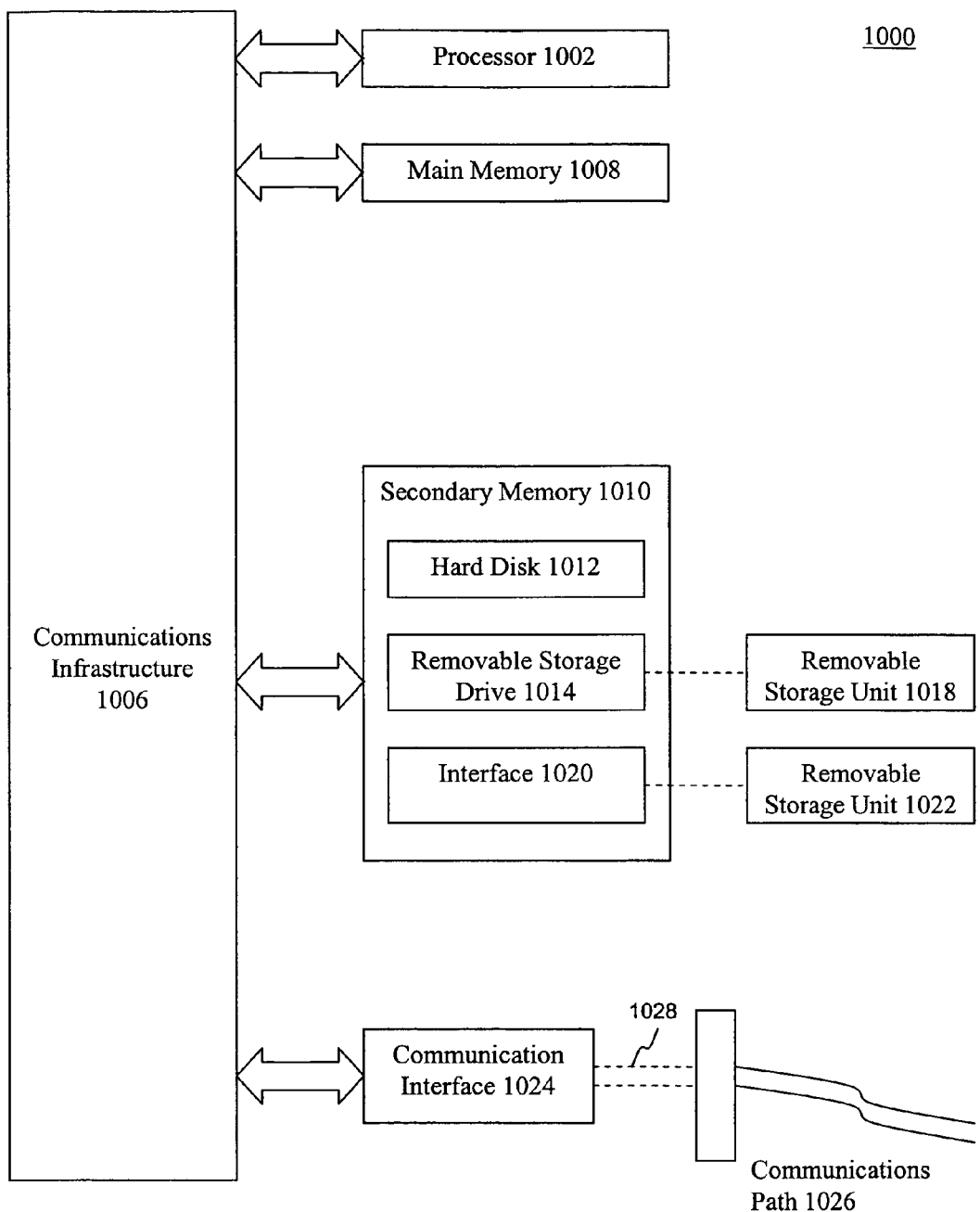
FIG. 10 is a block diagram of an exemplary computer connected to a network with which the exemplary method of FIG. 5 may be implemented.

FIG. 10 is a diagram of an exemplary computer system 1000 upon which the present invention may be implemented. The exemplary computer system 1000 includes one or more processors, such as processor 1002. The processor 1002 is connected to a communication infrastructure 1006, such as a bus or network. Various software implementations are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may include a secondary memory 1010. The secondary memory 1010 may include, for example, a hard disk drive 1012 and/or a removable storage drive 1014, representing a magnetic tape drive, an optical disk drive, etc. The removable storage drive 1014 reads from and/or writes to a removable storage unit 1018 in a well-known manner. Removable storage unit 1018 represents a magnetic tape, optical disk, or other storage medium that is read by and written to by removable storage drive 1014. As will be appreciated, the removable storage unit 1018 can include a computer usable storage medium having stored therein computer software and/or data.

In alternative implementations, secondary memory 1010 may include other means for allowing computer programs or other instructions to be loaded into computer system 1000. Such means may include, for example, a removable storage unit 1022 and an interface 1020. An example of such means may include a removable memory chip (such as an EPROM, or PROM) and associated socket, or other removable storage units 1022 and interfaces 1020, which allow software and data to be transferred from the removable storage unit 1022 to computer system 1000.

Computer system 1000 may also include one or more communications interfaces, such as communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, an RF link and other communications channels. In an embodiment of the invention, signals 1028 comprise data packets sent to processor 1002. Information representing processed packets can also be sent in the form of signals 1028 from processor 1002 through communications path 1026.

The terms "computer program medium" and "computer usable medium" are used to refer generally to media such as removable storage units 1018 and 1022, a hard disk installed in hard disk drive 1012, and signals 1028, which provide software to the computer system 1000.

Computer programs are stored in main memory 1008 and/or secondary memory 1010. Computer programs may also be received via communications interface 1024. Such computer programs, when executed, enable the computer system 1000 to implement the present invention as discussed herein. In particular, the computer programs, when executed, enable the processor 1002 to implement the present invention. Where the invention is implemented using software, the software may be stored in a computer program product and loaded into computer system 1000 using removable storage drive 1014, hard drive 1012 or communications interface 1024.

CONCLUSION

The disclosed collaborative filtering processes solve several problems by allowing a credit provider and merchants to customize promotions or marketing offers, while at the same time providing a value-added benefit for card members, by providing them with meaningful information about merchants they may want to patronize due to patronage from other (presumably similarly-situated) card members who carry and utilize the same particular brand of transaction instrument. The process leverages the ability to personalize information based on purchases already made by card members. By providing such personalized information to card members, a credit provider can expect to experience an increase in revenues due to transactions that are encouraged by the collaborative filtering process.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-based system for predicting spending habits of card members, comprising:
    a processor; and
    an instruction memory in communication with the processor for storing a plurality of processing instructions for directing the processor to:
    produce a data set corresponding to financial transactions of a plurality of card members with a plurality of restaurants;
    filter the data set, corresponding to a selected card member of the plurality of card members, to generate a set of candidate restaurants for the selected card member;
    generate for the selected card member, a probability of acceptance for each of the candidate restaurants;
    wherein the probability of acceptance (P) is determined by:

$$P=A+(B*(A-K))$$

wherein:
        A is a number of card-members having transactions with both the candidate restaurant and an identified restaurant;
        K is a constant;
        B is a value corresponding to a ratio of A to a total number of card member transactions with the identified restaurant; and
        a value of (A−K) is set to zero if its determined value results in a negative number.

2. A computer program product comprising a non transitory computer useable storage medium having computer executable instructions recorded thereon, such instructions comprising:
    instructions to produce a data set corresponding to financial transactions of a plurality of card members with a plurality of restaurants;
    instructions to filter the data set, corresponding to a selected card member of the plurality of card members, to generate a set of candidate restaurants for the selected card member;
    instructions to generate for the selected card member, a probability of acceptance for each of the candidate restaurants;
    wherein the probability of acceptance (P) is determined by:

$$P=A+(B*(A-K))$$

wherein:
        A is a number of card members having transactions with both the candidate restaurant and an identified restaurant;
        K is a constant;
        B is a value corresponding to a ratio of A to a total number of card member transactions with the identified restaurant; and
        a value of (A−K) is set to zero if its determined value results in a negative number.

3. A system, comprising:
    a processor means for producing a data set corresponding to financial transactions of a plurality of card members with a plurality of restaurants;
    a processor means for filtering the data set, corresponding to a selected card member of the plurality of card members, to generate a set of candidate restaurants for the selected card member;
    a processor means for generating, for the selected card member, a probability of acceptance for each of the candidate restaurants;
    wherein the probability of acceptance (P) is determined by:

$$P=A+(B*(A-K))$$

wherein:
        A is a number of card members having transactions with both the candidate restaurant and an identified restaurant;
        K is a constant;
        B is a value corresponding to a ratio of A to a total number of card member transactions with the identified restaurant; and
        a value of (A−K) is set to zero if its determined value results in a negative number.

4. The system of claim 3, further comprising determining an adventurousness measure of the card member based on the determined probability of acceptance for at least one candidate restaurant.

5. A method comprising:
    producing, by a computer, a data set corresponding to financial transactions of a plurality of card members with a plurality of restaurants;
    filtering, by the computer, the data set, corresponding to a selected card member of the plurality of card members, to generate a set of candidate restaurants for the selected card member;
    generating, by the computer, for the selected card member, a probability of acceptance for each of the candidate restaurants;
    wherein the probability of acceptance (P) is determined by:

$$P=A+(B*(A-K))$$

wherein:
        A is a number of card members having transactions with both the candidate restaurant and an identified restaurant;
        K is a constant;
        B is a value corresponding to a ratio of A to a total number of card member transactions with the identified restaurant; and
        a value of (A−K) is set to zero if its determined value results in a negative number.

6. The method of claim 5, wherein the filtering step further comprises:

identifying restaurants within the plurality of restaurants that have at least one financial transaction with the selected card member over the period of time;

determining, for each non-identified restaurant within the plurality of restaurants, a strength of association between each identified restaurant and each non-identified restaurant;

generating the set of candidate restaurants based on at least the strengths of association; and filtering the set of candidate restaurants according to at least one of: (i) an average transaction size and (ii) geographic location.

7. The method of claim 6, wherein filtering the set of candidate restaurants according to average transaction size further comprises:

obtaining an average transaction size for each candidate restaurant over the period of time;

determining an average transaction size for the identified restaurants over the period of time; and eliminating restaurants from the set of candidate restaurants based on at least the average transaction size of the candidate restaurant.

8. The method of claim 7, further comprising before the generating of a probability of acceptance, eliminating restaurants from the set of candidate restaurants whose average transaction size varies from the computed average transaction size by more than a predetermined amount.

9. The method of claim 6, wherein filtering the set of candidate restaurants according to location further comprises:

obtaining, for each identified restaurant, a distance traveled by the selected card member when visiting the identified restaurant;

determining a standard deviation for the obtained travel distances; and eliminating restaurants from the set of candidate restaurants based on at least the computed standard deviation of the obtained travel distances.

10. The method of claim 9, further comprising, before the generating of a probability of acceptance, eliminating restaurants from the set of candidate restaurants based on the distance between the candidate restaurant and the card member billing address exceeding the computed average distance by a predetermined amount.

11. The method of claim 5, wherein the generating step further comprises prioritizing each restaurant within the set of candidate restaurants based on the computed probability of acceptance of the candidate restaurant to generate the list of recommended restaurants.

12. The method of claim 5, further comprising:

determining, for each identified restaurant, a probability that the selected card member will have future financial transactions with the identified restaurant;

determining, for each identified restaurant and for each candidate restaurant, a probability that card members within the plurality of card members will have financial transactions at both the identified and the candidate restaurants; and determining, for each candidate restaurant, the probability that the selected card member will have multiple financial transactions at the candidate restaurant based on: (i) the probability that the selected card member will have future financial transactions with the identified restaurant and (ii) the probability that the other card members will have financial transactions at both the identified and the candidate restaurant, wherein the probability of acceptance represents the probability that the selected card member will have multiple future financial transactions involving the candidate restaurant.

13. The method of claim 12, wherein the probability that the selected card member will have at least one future financial transaction with the identified restaurant represents a ratio of a total number of financial transactions involving the selected card member and the identified restaurant to a total number of financial transactions involving the selected card member.

14. The method of claim 12, wherein the probability that card members will have financial transactions at both the identified and the candidate restaurants represents a ratio of a number of financial transactions involving the identified restaurant and the candidate restaurant to the total number of financial transactions involving the identified restaurant.

* * * * *

UNITED STATES PATENT AND TRADEMARK OFFICE
CERTIFICATE OF CORRECTION

| | | |
|---|---|---|
| PATENT NO. | : 7,792,697 B2 | Page 1 of 1 |
| APPLICATION NO. | : 11/500492 | |
| DATED | : September 7, 2010 | |
| INVENTOR(S) | : Puneet B. Bhagchandani et al. | |

It is certified that error appears in the above-identified patent and that said Letters Patent is hereby corrected as shown below:

Title Page, item (60) is added to read
--Provisional application No. 60/639,472, filed on Dec. 28, 2004--.

Signed and Sealed this
First Day of March, 2011

David J. Kappos
*Director of the United States Patent and Trademark Office*